US012799658B2

(12) United States Patent
Ewing

(10) Patent No.: US 12,799,658 B2
(45) Date of Patent: Nov. 17, 2026

(54) METHOD OF SENSING LOAD IMBALANCES IN A WASHING MACHINE APPLIANCE

(71) Applicant: Haier US Appliance Solutions, Inc., Wilmington, DE (US)

(72) Inventor: Cody Ewing, Floyds Knobs, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 368 days.

(21) Appl. No.: 18/649,370

(22) Filed: Apr. 29, 2024

(65) Prior Publication Data

US 2025/0333896 A1 Oct. 30, 2025

(51) Int. Cl.

| | |
|---|---|
| ***D06F 34/16*** | (2020.01) |
| ***D06F 23/04*** | (2006.01) |
| ***D06F 33/48*** | (2020.01) |
| ***D06F 34/04*** | (2020.01) |
| ***D06F 34/18*** | (2020.01) |
| ***D06F 34/20*** | (2020.01) |
| ***D06F 34/28*** | (2020.01) |

(Continued)

(52) U.S. Cl.

CPC .............. *D06F 34/16* (2020.02); *D06F 23/04* (2013.01); *D06F 33/48* (2020.02); *D06F 34/04* (2020.02); *D06F 34/18* (2020.02); *D06F 34/20* (2020.02); *D06F 34/28* (2020.02); *D06F 37/304* (2013.01); *G01M 1/16* (2013.01); *G01P 3/487* (2013.01); *D06F 2103/04* (2020.02); *D06F 2103/24* (2020.02); *D06F 2103/26* (2020.02); *D06F 2103/46* (2020.02); *D06F 2105/48* (2020.02); *D06F 2105/58* (2020.02)

(58) Field of Classification Search

CPC .......... D06F 34/16; D06F 33/48; D06F 34/20; D06F 34/04; D06F 34/18; D06F 34/28; D06F 23/04; D06F 37/304; D06F 2105/48; D06F 2103/26; D06F 2103/04; D06F 2105/58; D06F 2103/46; D06F 2103/24; G01M 1/16; G01P 3/487

USPC .......................................................... 68/12.06

See application file for complete search history.

(56) References Cited

U.S. PATENT DOCUMENTS

| | | | |
|---|---|---|---|
| 4,765,161 | A | 8/1988 | Williamson |
| 6,715,175 | B2 | 4/2004 | Ciancimino et al. |

(Continued)

FOREIGN PATENT DOCUMENTS

| | | | |
|---|---|---|---|
| CN | 104294533 | B | 4/2017 |
| CN | 109423811 | B | 5/2022 |

(Continued)

*Primary Examiner* — Tinsae B Ayalew
(74) *Attorney, Agent, or Firm* — Dority & Manning, P.A.

(57) ABSTRACT

A washing machine appliance includes a wash tub positioned within a cabinet, a wash basket rotatably mounted within the wash tub, a motor mechanically coupled to the wash basket, and a controller operably coupled to the motor. The controller is configured to operate the motor to spin the wash basket at a first speed for a dwell period, the first speed being below a first natural frequency of the washing machine appliance, obtain a motor power of the motor, obtain a basket speed of the wash basket, stop the motor at an end of the dwell period, analyze the motor power and the basket speed to identify an out of balance condition, and implement a responsive action in response to identifying the out of balance condition.

20 Claims, 5 Drawing Sheets

(51) Int. Cl.

| | |
|---|---|
| ***D06F 37/30*** | (2020.01) |
| ***G01M 1/16*** | (2006.01) |
| ***G01P 3/487*** | (2006.01) |
| *D06F 103/04* | (2020.01) |
| *D06F 103/24* | (2020.01) |
| *D06F 103/26* | (2020.01) |
| *D06F 103/46* | (2020.01) |
| *D06F 105/48* | (2020.01) |
| *D06F 105/58* | (2020.01) |

(56) References Cited

U.S. PATENT DOCUMENTS

| | | | | |
|---|---|---|---|---|
| 8,813,288 | B2 | 8/2014 | Bhandwale et al. | |
| 8,914,930 | B2 | 12/2014 | Chanda et al. | |
| 8,918,937 | B2 | 12/2014 | Clemons et al. | |
| 9,994,987 | B2 | 6/2018 | Im et al. | |
| 2013/0119909 | A1 * | 5/2013 | Clemons | D06F 33/48 318/434 |

FOREIGN PATENT DOCUMENTS

| | | | |
|---|---|---|---|
| EP | 0394177 | A2 | 10/1990 |
| EP | 2478142 | B1 | 9/2021 |
| JP | H09253379 | A | 9/1997 |
| JP | 2006296540 | A | 11/2006 |
| KR | 100239562 | B1 | 1/2000 |
| KR | 101368292 | B1 | 2/2014 |

* cited by examiner

METHOD OF SENSING LOAD IMBALANCES IN A WASHING MACHINE APPLIANCE

FIELD OF THE INVENTION

The present disclosure relates generally to top load washing machines, in particular a method of operating a top loading washing machine to sense a load imbalance prior to a spin cycle.

BACKGROUND OF THE INVENTION

Washing machine appliances generally include a cabinet which supports a wash tub for containing wash fluid, e.g., wash water, detergent, bleach, and/or other wash additives. A wash basket is mounted within the wash tub and defines a wash chamber for receipt of articles for washing. During operation of such washing machine appliances, wash fluid is directed into the wash tub and onto articles within the wash chamber of the wash basket. The wash basket or an agitation element can rotate at various speeds to agitate articles within the wash chamber in the wash fluid. A spin cycle is often included after some cycles, for example at the end of a wash cycle or a rinse cycle. During the spin cycle, the wash basket spins at a high speed to urge wash fluid from articles within the wash chamber.

In some cases, an uneven distribution of weight during a spin cycle in a top load washing machine may cause excessive displacement of the wash tub and wash basket. In minor cases, a slight imbalance may cause vibration or noise. In extreme cases, the wash tub may contact the cabinet of the appliance. These impacts or "cabinet strikes" are noisy and can cause the washing machine to "walk" on the floor. Over time, the impacts can cause damage to the appliance.

Some known top load washing machines sense a load imbalance during a spin cycle by sensing vibration or cabinet strikes. The excessive vibrations and cabinet strikes that occur before the load imbalance is corrected can lead to consumer dissatisfaction or machine damage. Additionally, the machine may not reach the desired dehydration speed for an unbalanced load, resulting in a "wet load." Notably, it can be difficult for modern washing machines to detect unbalanced loads and these loads can result in damage to the washing machine or its components if not detected and handled appropriately. Certain conventional methods for monitoring out of balance loads are costly and require complex sensors and software to process the sensor outputs. Alternatively, other methods for assessing out of balance amounts depend on the basket rotating at speeds where the subwasher may come into contact with other components, such as the cabinet.

Accordingly, a method of sensing an out of balance condition prior to initiating a spin cycle may be desirable. More specifically, a system for sensing an out of balance load with minimal costs and complexity would be particularly beneficial.

BRIEF DESCRIPTION OF THE INVENTION

Aspects and advantages of the invention will be set forth in part in the following description, may be apparent from the description, or may be learned through practice of the invention.

In one exemplary embodiment, a washing machine appliance defining a vertical direction, a lateral direction, and a transverse direction is provided. The washing machine appliance includes a wash tub positioned within a cabinet, a wash basket rotatably mounted within the wash tub, a motor mechanically coupled to the wash basket, a controller operably coupled to the motor. The controller is configured to operate the motor to spin the wash basket at a first speed for a dwell period, the first speed being below a first natural frequency of the washing machine appliance, obtain a motor power of the motor, obtain a basket speed of the wash basket, stop the motor at an end of the dwell period, analyze the motor power and the basket speed to identify an out of balance condition, and implement a responsive action in response to identifying the out of balance condition.

In another exemplary embodiment, a method of operating a washing machine appliance is provided. The washing machine appliance includes a wash tub positioned within a cabinet, a wash basket rotatably mounted within the wash tub, and a motor mechanically coupled to the wash basket. The method includes operating the motor to spin the wash basket at a first speed for a dwell period, the first speed being below a first natural frequency of the washing machine appliance, obtaining a motor power of the motor, obtaining a basket speed of the wash basket, stopping the motor at an end of the dwell period, analyzing the motor power and the basket speed to identify an out of balance condition, and implementing a responsive action in response to identifying the out of balance condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
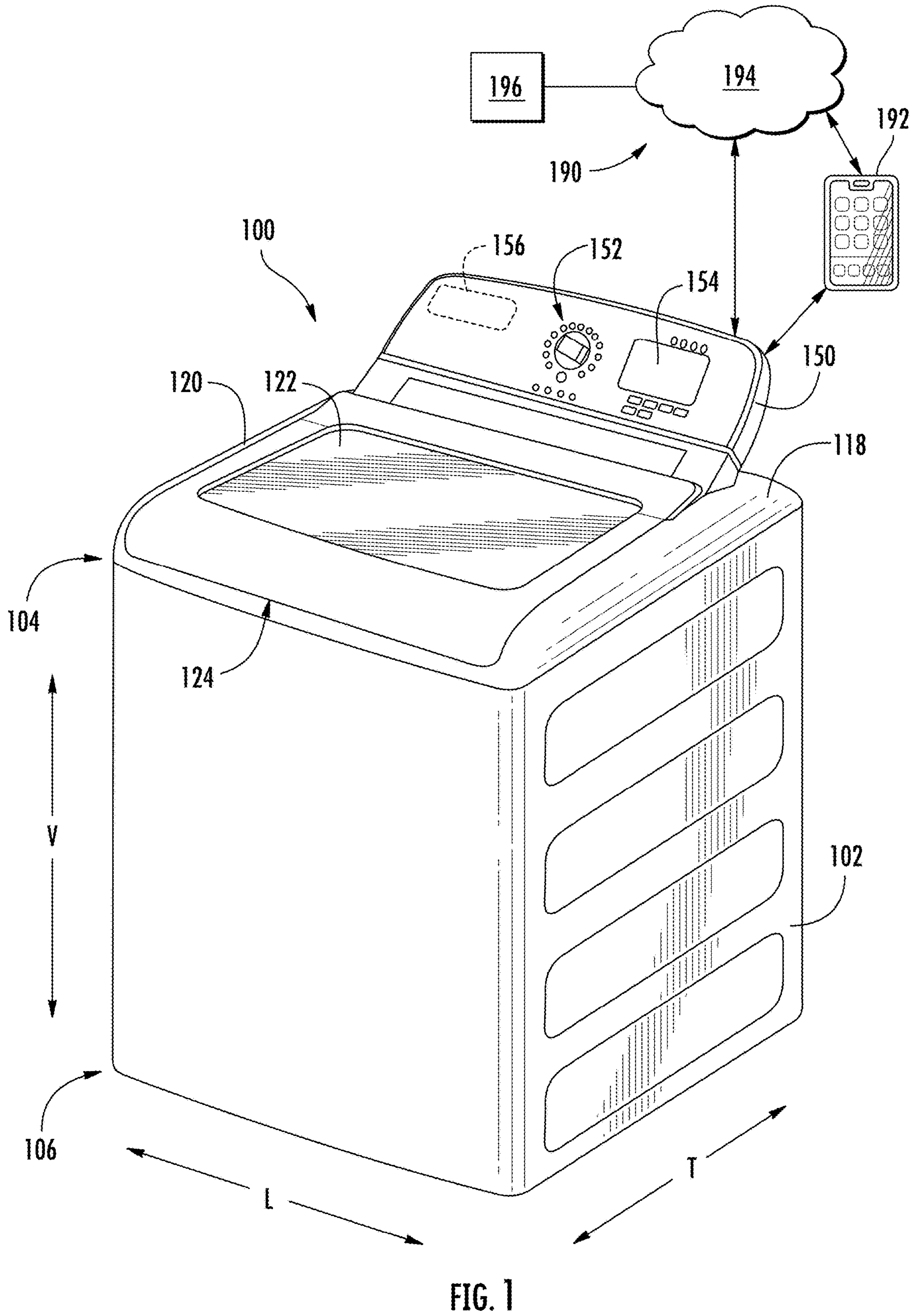
FIG. 1 provides a perspective view of a washing machine appliance according to an example embodiment of the present subject matter with a lid in a closed position.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
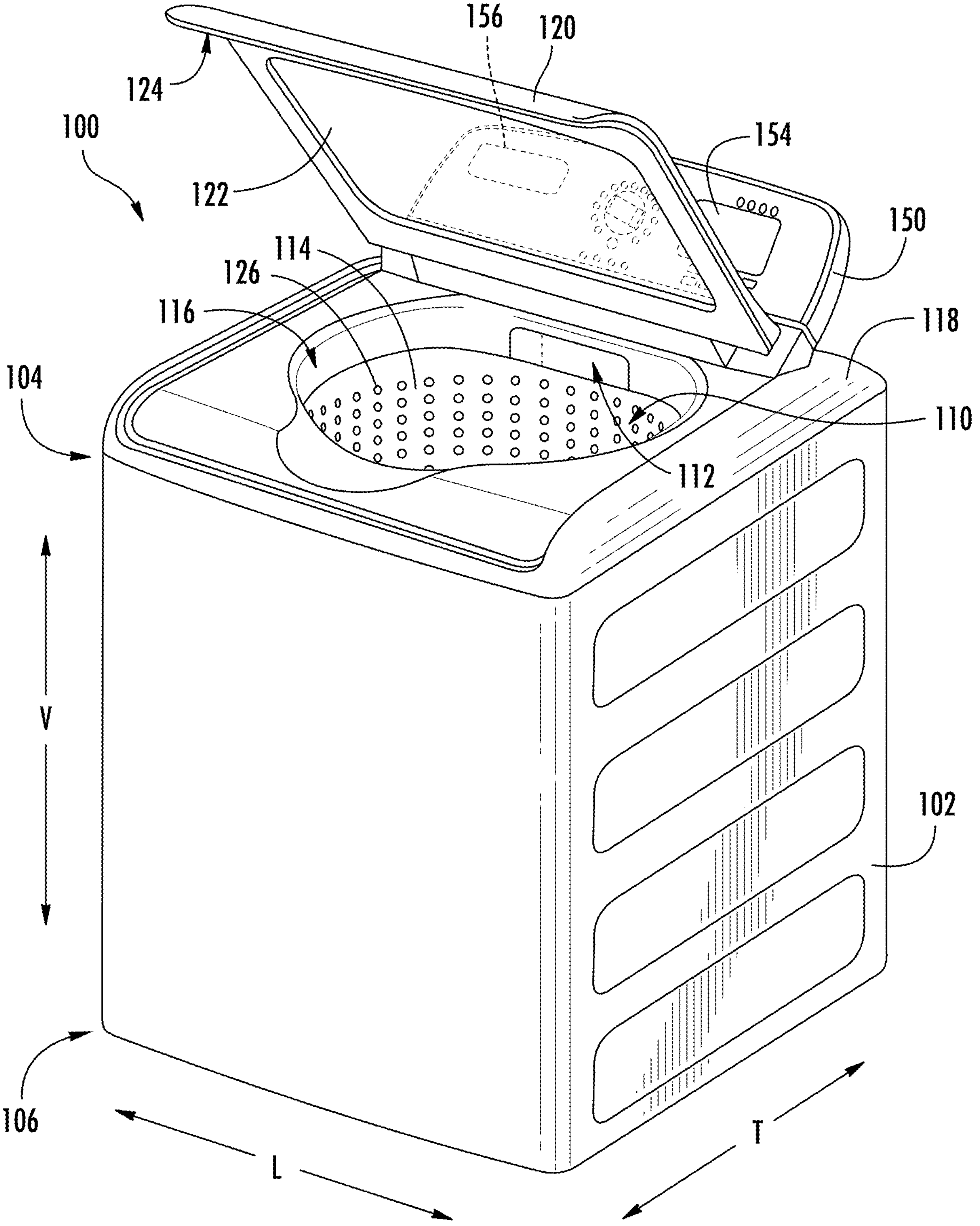
FIG. 2 provides a perspective view of the example washing machine appliance of FIG. 1 with the lid of the washing machine appliance shown in an open position according to an example embodiment of the present subject matter.
Figure 3:
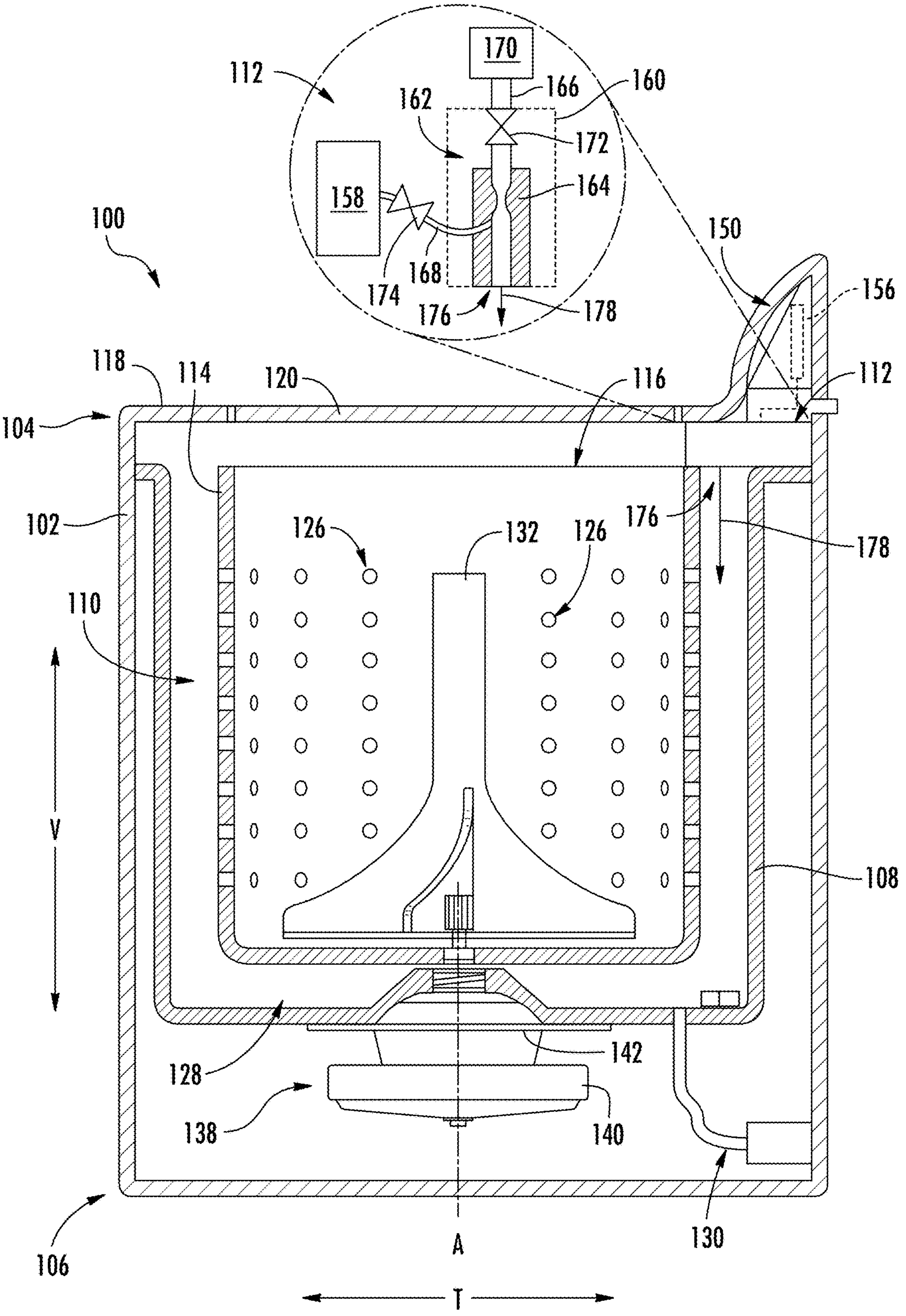
FIG. 3 provides a side cross-sectional view of the example washing machine appliance of FIG. 1 according to an example embodiment of the present subject matter.

FIGS. 1 through 3 illustrate an exemplary embodiment of a vertical axis washing machine appliance 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 100, it should be appreciated that vertical axis washing machine appliance 100 is provided by way of example only. It will be understood that aspects of the present subject matter may be used in any other suitable washing machine appliance, such as a horizontal axis washing machine appliance. Indeed, modifications and variations may be made to washing machine appliance 100, including different configurations, different appearances, and/or different features while remaining within the scope of the present subject matter.

Washing machine appliance 100 has a cabinet 102 that extends between a top portion 104 and a bottom portion 106 along the vertical direction V, between a first side (left) and a second side (right) along the lateral direction L, and between a front and a rear along the transverse direction T. As best shown in FIG. 3, a wash tub 108 is positioned within cabinet 102, defines a wash chamber 110, and is generally configured for retaining wash fluids during an operating cycle. Washing machine appliance 100 further includes a primary dispenser or dispensing assembly 112 (FIG. 2) for dispensing wash fluid into wash tub 108.

In addition, washing machine appliance 100 includes a wash basket 114 that is positioned within wash tub 108 and generally defines an opening 116 for receipt of articles for washing. More specifically, wash basket 114 is rotatably mounted within wash tub 108 such that it is rotatable about an axis of rotation A. According to the illustrated embodiment, the axis of rotation A is substantially parallel to the vertical direction V. In this regard, washing machine appliance 100 is generally referred to as a "vertical axis" or "top load" washing machine appliance 100. However, it should be appreciated that aspects of the present subject matter may be used within the context of a horizontal axis or front load washing machine appliance as well.

As illustrated, cabinet 102 of washing machine appliance 100 has a top panel 118. Top panel 118 defines an opening (FIG. 2) that coincides with opening 116 of wash basket 114 to permit a user access to wash basket 114. Washing machine appliance 100 further includes a door 120 which is rotatably mounted to top panel 118 to permit selective access to opening 116. In particular, door 120 selectively rotates between the closed position (as shown in FIGS. 1 and 3) and the open position (as shown in FIG. 2). In the closed position, door 120 inhibits access to wash basket 114. Conversely, in the open position, a user can access wash basket 114. A window 122 in door 120 permits viewing of wash basket 114 when door 120 is in the closed position, e.g., during operation of washing machine appliance 100. Door 120 also includes a handle 124 that, e.g., a user may pull and/or lift when opening and closing door 120. Further, although door 120 is illustrated as mounted to top panel 118, door 120 may alternatively be mounted to cabinet 102 or any other suitable support.

As best shown in FIGS. 2 and 3, wash basket 114 further defines a plurality of perforations 126 to facilitate fluid communication between an interior of wash basket 114 and wash tub 108. In this regard, wash basket 114 is spaced apart from wash tub 108 to define a space for wash fluid to escape wash chamber 110. During a spin cycle, wash fluid within articles of clothing and within wash chamber 110 is urged through perforations 126 wherein it may collect in a sump 128 defined by wash tub 108. Washing machine appliance 100 further includes a pump assembly 130 (FIG. 3) that is located beneath wash tub 108 and wash basket 114 for gravity assisted flow when draining wash tub 108.

An impeller or agitation element 132 (FIG. 3), such as a vane agitator, impeller, auger, oscillatory basket mechanism, or some combination thereof is disposed in wash basket 114 to impart an oscillatory motion to articles and liquid in wash basket 114. More specifically, agitation element 132 extends into wash basket 114 and assists agitation of articles disposed within wash basket 114 during operation of washing machine appliance 100, e.g., to facilitate improved cleaning. In different embodiments, agitation element 132 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitation element 132 and wash basket 114 are oriented to rotate about axis of rotation A (which is substantially parallel to vertical direction V).

As best illustrated in FIG. 3, washing machine appliance 100 includes a drive assembly or motor assembly 138 in mechanical communication with wash basket 114 to selectively rotate wash basket 114 (e.g., during an agitation or a rinse cycle of washing machine appliance 100). In addition, motor assembly 138 may also be in mechanical communication with agitation element 132. In this manner, motor assembly 138 may be configured for selectively rotating or oscillating wash basket 114 and/or agitation element 132 during various operating cycles of washing machine appliance 100.

More specifically, motor assembly 138 may generally include one or more of a drive motor 140 and a transmission assembly 142, e.g., such as a clutch assembly, for engaging and disengaging wash basket 114 and/or agitation element 132. According to the illustrated embodiment, drive motor 140 is a brushless DC electric motor, e.g., a pancake motor. However, according to alternative embodiments, drive motor 140 may be any other suitable type or configuration of motor. For example, drive motor 140 may be an AC motor, an induction motor, a permanent magnet synchronous motor, or any other suitable type of motor. In addition, motor assembly 138 may include any other suitable number, types, and configurations of support bearings or drive mechanisms.

Referring still to FIGS. 1 through 3, a control panel 150 with at least one input selector 152 (FIG. 1) extends from top panel 118. Control panel 150 and input selector 152 collectively form a user interface input for operator selection of machine cycles and features. A display 154 of control panel 150 indicates selected features, operation mode, a countdown timer, and/or other items of interest to appliance users regarding operation.

Operation of washing machine appliance 100 is controlled by a controller or processing device 156 that is operatively coupled to control panel 150 for user manipulation to select washing machine cycles and features. In response to user manipulation of control panel 150, controller 156 operates the various components of washing machine appliance 100 to execute selected machine cycles and features. According to an exemplary embodiment, controller 156 may include a memory and microprocessor, such as a general or special purpose microprocessor operable to execute programming instructions or micro-control code associated with methods described herein. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of washing machine appliance 100 may be in communication with controller 156 via one or more signal lines or shared communication busses.

During operation of washing machine appliance 100, laundry items are loaded into wash basket 114 through opening 116, and washing operation is initiated through operator manipulation of input selectors 152. Wash basket 114 is filled with water and detergent and/or other fluid additives via primary dispenser 112. One or more valves can be controlled by washing machine appliance 100 to provide for filling wash tub 108 and wash basket 114 to the appropriate level for the amount of articles being washed and/or rinsed. By way of example for a wash mode, once wash basket 114 is properly filled with fluid, the contents of wash basket 114 can be agitated (e.g., with agitation element 132 as discussed previously) for washing of laundry items in wash basket 114.

After completion of the agitation cycle, washing machine appliance 100 may perform one or more rinse cycles. Specifically, according to an example embodiment, drain pump assembly 130 may drain the wash fluid from wash tub 108 and dispensing assembly 112 may dispense fresh water and/or a wash additive (such as fabric softener) into the wash tub. The load of clothes may then be agitated in the fresh water, e.g., to remove soil and detergent from load of clothes. After completion of the rinse cycle(s), drain pump assembly 130 may drain wash tub 108 and a spin cycle may be used to extract water from the clothes before the wash cycle is concluded.

Referring again to FIGS. 2 and 3, dispensing assembly 112 of washing machine appliance 100 will be described in more detail. As explained briefly above, dispensing assembly 112 may generally be configured to dispense wash fluid to facilitate one or more operating cycles or phases of an operating cycle (e.g., such as a wash cycle or a rinse cycle). The terms "wash fluid" and the like may be used herein to generally refer to a liquid used for washing and/or rinsing clothing or other articles. For example, the wash fluid is typically made up of water that may include other additives such as detergent, fabric softener, bleach, or other suitable treatments (including combinations thereof). More specifically, the wash fluid for a wash cycle may be a mixture of water, detergent, and/or other additives, while the wash fluid for a rinse cycle may be water only and/or additional rinse additives.

As best shown schematically in FIG. 3, dispensing assembly 112 may generally include a bulk storage tank or bulk reservoir 158 and a dispenser box 160. More specifically, bulk reservoir 158 may be positioned under top panel 118 and defines an additive reservoir for receiving and storing wash additive. More specifically, according to the illustrated embodiment, bulk reservoir 158 may contain a bulk volume of wash additive (such as detergent or other suitable wash additives) that is sufficient for a plurality of wash cycles of washing machine appliance 100, such as no less than twenty wash cycles, no less than fifty wash cycles, etc. As a particular example, bulk reservoir 158 is configured for containing no less than twenty fluid ounces, no less than three-quarters of a gallon, or about one gallon of wash additive.

As will be described in detail below, dispensing assembly 112 may include features for drawing wash additive from bulk reservoir 158 and mixing it with water prior to directing the mixture into wash tub 108 to facilitate a cleaning operation. By contrast, dispensing assembly 112 is also capable of dispensing water only. Thus, dispensing assembly 112 may automatically dispense the desired amount of water with or without a desired amount of wash additive such that a user can avoid filling dispenser box 160 with detergent before each operation of washing machine appliance 100.

For example, as best shown in FIG. 3, washing machine appliance 100 includes an aspirator assembly 162, which is a Venturi-based dispensing system that uses a flow of water to create suction within a Venturi tube to draw in wash additive from bulk reservoir 158 which mixes with the water and is dispensed into wash tub 108 as a concentrated wash fluid preferably having a target volume of wash additive. After the target volume of wash additive is dispensed into wash tub 108, additional water may be provided into wash tub 108 as needed to fill to the desired wash volume. It should be appreciated that the target volume may be pre-programmed in controller 156 according to the selected operating cycle or parameters, may be set by a user, or may be determined in any other suitable manner.

As illustrated, aspirator assembly 162 includes a Venturi pump 164 that is fluidly coupled to both a water supply conduit 166 and a suction line 168. As illustrated, water supply conduit 166 may provide fluid communication between a water supply source 170 (such as a municipal water supply) and a water inlet of Venturi pump 164. In addition, washing machine appliance 100 includes a water fill valve or water control valve 172 which is operably coupled to water supply conduit 166 and is communicatively coupled to controller 156. In this manner, controller 156 may regulate the operation of water control valve 172 to regulate the amount of water that passes through aspirator assembly 162 and into wash tub 108.

In addition, suction line 168 may provide fluid communication between bulk reservoir 158 and Venturi pump 164 (e.g., via a suction port defined on Venturi pump 164). Notably, as a flow of water is supplied through Venturi pump 164 to wash tub 108, the flowing water creates a negative pressure within suction line 168. This negative pressure may draw in wash additive from bulk reservoir 158. When certain conditions exist, the amount of wash additive dispensed is roughly proportional to the amount of time water is flowing through Venturi pump 164.

Referring still to FIG. 3, aspirator assembly 162 may further include a suction valve 174 that is operably coupled to suction line 168 to control the flow of wash additive through suction line 168 when desired. For example, suction valve 174 may be a solenoid valve that is communicatively coupled with controller 156. Controller 156 may selectively open and close suction valve 174 to allow wash additive to flow from bulk reservoir 158 through additive suction valve 174. For example, during a rinse cycle where only water is desired, suction valve 174 may be closed to prevent wash additive from being dispensed through suction valve 174. In some embodiments, suction valve 174 is selectively controlled based on at least one of the selected wash cycle, the soil level of the articles to be washed, and the article type. According to still other embodiments, no suction valve 174 is needed at all and alternative means for preventing the flow of wash additive may be used or other water regulating valves may be used to provide water into wash tub 108.

Washing machine appliance 100, or more particularly, dispensing assembly 112, generally includes a discharge nozzle 176 for directing a flow of wash fluid (e.g., identified herein generally by reference numeral 178) into wash tub 108. In this regard, discharge nozzle 176 may be positioned above wash tub 108 proximate a rear of opening 116 defined through top panel 118. Dispensing assembly 112 may be regulated by controller 156 to discharge wash fluid 178 through discharge nozzle 176 at the desired flow rates, volumes, and/or detergent concentrations to facilitate various operating cycles, e.g., such as wash or rinse cycles.

Although water supply conduit 166, water supply source 170, discharge nozzle 176, and water control valve 172 are all described and illustrated herein in the singular form, it should be appreciated that these terms may be used herein generally to describe a supply plumbing for providing hot and/or cold water into wash chamber 110. In this regard, water supply conduit 166 may include separate conduits for receiving hot and cold water, respectively. Similarly, water supply source 170 may include both hot- and cold-water supplies regulated by dedicated valves. In addition, washing machine appliance 100 may include one or more pressure sensors (not shown) for detecting the amount of water and or clothes within wash tub 108. For example, the pressure sensor may be operably coupled to a side of wash tub 108 for detecting the weight of wash tub 108, which controller 156 may use to determine a volume of water in wash chamber 110 and a subwasher load weight.

After wash tub 108 is filled and the agitation phase of the wash cycle is completed, wash basket 114 can be drained, e.g., by drain pump assembly 130. Laundry articles can then be rinsed by again adding fluid to wash basket 114 depending on the specifics of the cleaning cycle selected by a user. The impeller or agitation element 132 may again provide agitation within wash basket 114. One or more spin cycles may also be used as part of the cleaning process. In particular, a spin cycle may be applied after the wash cycle and/or after the rinse cycle in order to wring wash fluid from the articles being washed. During a spin cycle, wash basket 114 is rotated at relatively high speeds to help wring fluid from the laundry articles through perforations 126. During or prior to the spin cycle, drain pump assembly 130 may operate to discharge wash fluid from wash tub 108, e.g., to an external drain. After articles disposed in wash basket 114 are cleaned and/or washed, the user can remove the articles from wash basket 114, e.g., by reaching into wash basket 114 through opening 116.

Referring still to FIG. 1, a schematic diagram of an external communication system 190 will be described according to an exemplary embodiment of the present subject matter. In general, external communication system 190 is configured for permitting interaction, data transfer, and other communications between washing machine appliance 100 and one or more external devices. For example, this communication may be used to provide and receive operating parameters, user instructions or notifications, performance characteristics, user preferences, or any other suitable information for improved performance of washing machine appliance 100. In addition, it should be appreciated that external communication system 190 may be used to transfer data or other information to improve performance of one or more external devices or appliances and/or improve user interaction with such devices.

For example, external communication system 190 permits controller 156 of washing machine appliance 100 to communicate with a separate device external to washing machine appliance 100, referred to generally herein as an external device 192. As described in more detail below, these communications may be facilitated using a wired or wireless connection, such as via a network 194. In general, external device 192 may be any suitable device separate from washing machine appliance 100 that is configured to provide and/or receive communications, information, data, or commands from a user. In this regard, external device 192 may be, for example, a personal phone, a smartphone, a tablet, a laptop or personal computer, a wearable device, a smart home system, or another mobile or remote device.

In addition, a remote server 196 may be in communication with washing machine appliance 100 and/or external device 192 through network 194. In this regard, for example, remote server 196 may be a cloud-based server 196, and is thus located at a distant location, such as in a separate state, country, etc. According to an exemplary embodiment, external device 192 may communicate with a remote server 196 over network 194, such as the Internet, to transmit/receive data or information, provide user inputs, receive user notifications or instructions, interact with or control washing machine appliance 100, etc. In addition, external device 192 and remote server 196 may communicate with washing machine appliance 100 to communicate similar information.

In general, communication between washing machine appliance 100, external device 192, remote server 196, and/or other user devices or appliances may be carried using any type of wired or wireless connection and using any suitable type of communication network, non-limiting examples of which are provided below. For example, external device 192 may be in direct or indirect communication with washing machine appliance 100 through any suitable wired or wireless communication connections or interfaces, such as network 194. For example, network 194 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 190 is described herein according to an exemplary embodiment of the present subject matter. However, it should be appreciated that the exemplary functions and configurations of external communication system 190 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, and/or different features may also be utilized with the present subject matter as well, e.g., horizontal axis washing machine appliances. In addition, aspects of the present subject matter may be utilized in a combination washer/dryer appliance.

Now that the construction of washing machine appliance 100 and the configuration of controller 156 according to exemplary embodiments have been presented, an exemplary method 200 of operating a washing machine appliance will be described. Specifically, method 200 may be used to detect an out of balance condition in a washing machine appliance, such as the washing machine appliance 100. Although the discussion below refers to the exemplary method 200 of operating washing machine appliance 100, one skilled in the art will appreciate that the exemplary method 200 is applicable to the operation of a variety of other washing machine appliances, such as horizontal axis washing machine appliances. In exemplary embodiments, the various method steps as disclosed herein may be performed by controller 156 or a separate, dedicated controller.

Specifically, method 200 includes, at step 210, operating a motor to spin a wash basket at a first speed for a dwell period, the first speed being below a first natural frequency of a washing machine appliance. In this regard, continuing the example from above, method 200 may be used to operate washing machine appliance 100 after a wash and/or agitation cycle where the load of clothes has been cleaned. In this regard, the load of clothes may be agitated within wash chamber 110 during the agitation cycle while the total volume of wash fluid is present, thereby cleaning the articles of clothing. As used herein, the “total volume of wash fluid” and the like are generally intended to refer to the target level of wash fluid associated with the agitation or wash cycle. In this regard, the total volume may be an amount (e.g., in gallons) needed to effectively wash the load of clothes during an agitation cycle.

Notably, a conventional wash cycle would enter directly into a spin and drain cycle after the agitation cycle. However, if the load of clothes is not evenly distributed within wash basket 114 at the end of the agitation cycle, immediately entering a high spin speed may result in undesirable vibrations due to the out of balance condition which may result in appliance damage, consumer dissatisfaction, etc. Accordingly, method 200 may provide a novel means for detecting out of balance conditions before entering the spin cycle. Specifically, step 210 may include spinning at the first speed which is generally below a speed which may cause excessive vibrations or apron strikes that may occur during a subsequent spin cycle.

In this regard, the first natural frequency of washing machine appliance 100 may be a predetermined frequency at which vibrations exceed a predetermined threshold and cabinet strikes could occur. For example, the first speed and the associated first natural frequency of the washing machine appliance may occur between about 10 and 60 revolutions per minute (RPM), between about 20 and 55 RPM, between about 30 and 50 RPM, or about 40 RPM. For example, the first speed may be lower than a spin speed or an extraction speed where wash fluid is actively extracted from the laundry load. By monitoring the motor power and basket speed while the basket is rotated to the first speed, an out of balance condition may be detected prior to initiating a spin cycle. It should be appreciated that the first speed and the corresponding first natural frequency may vary depending on the appliance configuration, machine suspension, installation, and other factors.

Step 220 may generally include obtaining a motor power of the motor as it is spinning wash basket 114. In this regard, controller 156 may be used to monitor the applied power at drive motor 140. According to alternative embodiments, other methods for determining motor power may be used while remaining within the scope of the present subject matter. Simultaneously, step 230 may include obtaining a basket speed of the wash basket. According to example embodiments, basket speed may be measured using a magnet and hall-effect sensor, though other means for measuring the basket speed may be used while remaining within the scope of the present subject matter.

Figure 5:
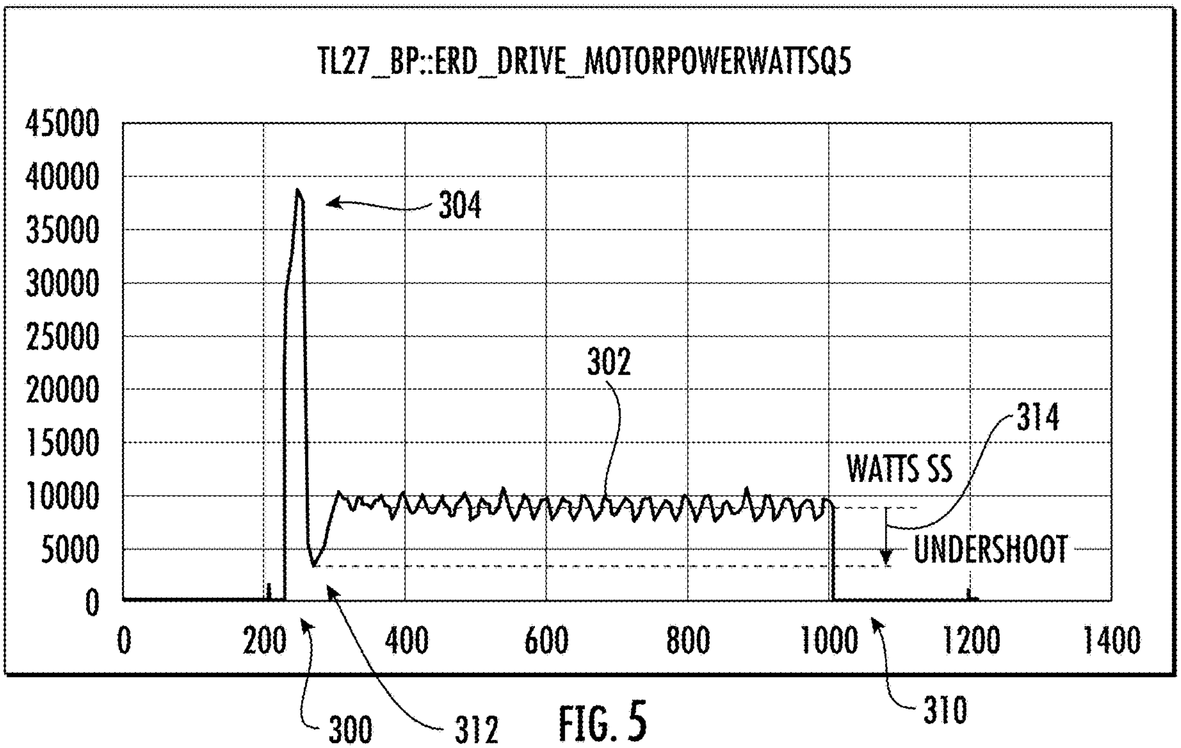
FIG. 5 is a plot of a motor power during an out of balance detection process according to an example embodiment of the present subject matter.

As shown for example in FIG. 5, the motor power during an exemplary out of balance detection process is illustrated. In addition, as shown for example in FIG. 6, the basket speed during the same out of balance detection process is illustrated. Referring to both FIGS. 5 and 6, the motor begins operation at a start time 300, at which time a motor power (e.g., identified by reference numeral 302) may be monitored. A large power spike (e.g., identified by reference numeral 304) may occur as the motor attempts to get the basket speed (e.g., identified generally by reference numeral 306) up to the first speed (e.g., identified generally by reference numeral 308). According to example embodiments, power may be applied to maintain the wash basket speed at or around the first speed until the end of the dwell period (e.g., identified by reference numeral 310, which may be 5 seconds, 10 seconds, or any other suitable amount of time). Step 240 may generally include stopping the motor at the end of the dwell period 310. All this may occur prior to performing a spin cycle.

Notably, by monitoring motor power 302 and basket speed 306 during this out of balance detection process, an out of balance condition of a load of clothes within wash basket 114 may be determined with a high degree of accuracy. Moreover, these out of balance conditions may be detected without the need for expensive sensors (e.g., such as accelerometers) and without complex software. Although an exemplary method of analyzing this information is provided below, it should be appreciated that variations and modifications may be made while remaining within the scope of the present subject matter.

In this regard, step 250 may generally include analyzing the motor power and the basket speed to identify an out of balance condition. For example, the motor power obtained at step 220 may be used to determine an average motor power over the dwell period. It should be appreciated that the average motor powers illustrated in FIG. 5 are only intended to facilitate discussion of the present subject matter and may vary. According to an example embodiment, analyzing the motor power and the basket speed to identify the out of balance condition may include determining that the average motor power exceeds a predetermined power threshold.

In this regard, for example, more motor power 302 may generally be required to spin loads with larger imbalances e.g., as the drive motor 140 struggles to spin up the imbalanced load and keep it at the first speed. Accordingly, by monitoring the average motor power during the dwell period, useful information regarding the load size and the out of balance amount may be obtained. It should be appreciated that the predetermined power threshold may be preset by the manufacturer and may be determined using empirical studies for a specific washing machine configuration. For example, the average motor power may be stored in a lookup table or algorithm that maintains a relationship between motor power and the out of balance magnitude.

As best shown in FIG. 5, the motor power 302 may generally experience a motor power undershoot (e.g., identified generally by reference numeral 312) after the power spike 304. In this regard, once the basket speed 306 reaches first speed 308, motor power 302 may be stopped and motor power undershoot 312 may occur before motor power 302 rises back to a steady state that maintains basket speed 306 at first speed 308. According to example embodiments, monitoring an amplitude of motor power undershoot 312 may provide useful information regarding the amount of load imbalance. For example, the amplitude of the motor power undershoot (e.g., identified by reference numeral 314 in FIG. 5) may be measured as the difference between the steady-state wattage needed to maintain basket speed 306 at first speed 308 and the motor power undershoot 312. A smaller undershoot amplitude 314 may generally indicate a larger imbalance. Accordingly, the analysis performed at step 250 may include determining that the motor power undershoot or the amplitude of the motor power undershoot falls below a predetermined threshold. It should be appreciated that the predetermined threshold may be preset by the manufacturer and may be determined using empirical studies for a specific washing machine configuration. For example, the threshold for the amplitude of the motor power undershoot may be stored in a lookup table or algorithm that maintains a relationship between motor power undershoot and the out of balance magnitude.

Figure 6:
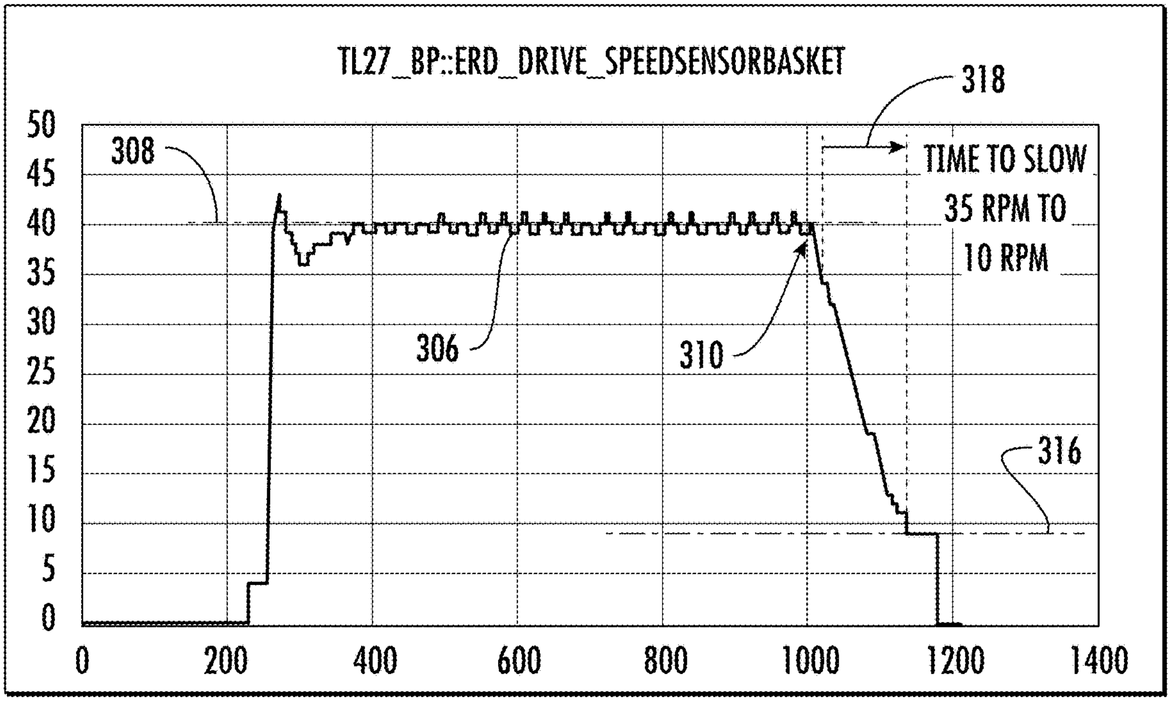
FIG. 6 is a plot of a basket speed during an out of balance detection process according to an example embodiment of the present subject matter.

As best shown in FIG. 6, when motor power 302 is removed at the end of dwell period (e.g., at time 310), basket speed 306 may slowly begin to drop as wash basket 114 coasts to a stationary position. Notably, larger loads may generally take a longer amount of time coast from first speed 308 to 0 RPM or to some other threshold. According to example embodiments, this coast time or rate may be used to further refine the imbalance detection process. For example, analyzing the motor power and basket speed to identify the out of balance condition may include measuring a coast time that it takes for the basket speed to fall to a second speed (e.g., identified generally by reference numeral 316). According to an example embodiment, the second speed 316 is lower than the first speed 308 and may be between about 5 and 20 RPM, or about 10 RPM. For example, the coast time is illustrated in FIG. 6 by reference numeral 318. The analysis may further include estimating a load size based at least in part on the coast time. Notably, it may be desirable to know the overall load size because the effects of an imbalance may vary based on the load size. In this regard, a 3-pound imbalance may have a large effect on a light load while having a minimal effect on a heavier load.

As described herein method 200 has been described as monitoring average motor power 302, coast time 318, and motor power undershoot 312, along with other power and speed parameters. Each of these values may provide useful information regarding load size, the amount of imbalance, etc. However, according to an example embodiment, all of these values may be used simultaneously to obtain a comprehensive estimate of the load size and the out of balance present within that load. For example, controller 156 may be programmed with a lookup table or a regression equation that uses each of these values as an input and provides an out of balance load value that may be used to make informed judgment and take proper actions with a subsequent spin cycle. It should be appreciated that these regression equations may be determined empirically based on the particular washing machine appliance configuration and other parameters.

Step 260 may generally include implementing a responsive action in response to identifying the out of balance condition. For example, implementing the responsive action may include performing a load redistribution procedure. For example, the load redistribution may include adding wash fluid to wash tub 108 and re-agitating the load of clothes to improve the distribution. According to example embodiments, steps 220 through 260 may be performed again until the out of balance condition is cured. In addition, implementing the responsive action in response to identifying the out of balance condition may further include providing a user notification of the out of balance condition. For example, this user notification may be provided through a control panel 150, e.g., via display 154. According to still other embodiments, the user notification may be provided to a remote device 192 (e.g., such as a user's cell phone) using network 194. This user notification may include recommendations on rebalancing the load of clothes or other instructions for rectifying the out of balance condition.

Method 200 may further include proceeding with a spin cycle if an out of balance condition is not detected. Accordingly, method 200 may include analyzing the motor power and the basket speed to identify a balanced load condition (e.g., no out of balance condition detected). If the out of balance condition does not exist, method 200 may further include performing a spin cycle and completing the operating cycle of washing machine appliance 100.

Figure 4:
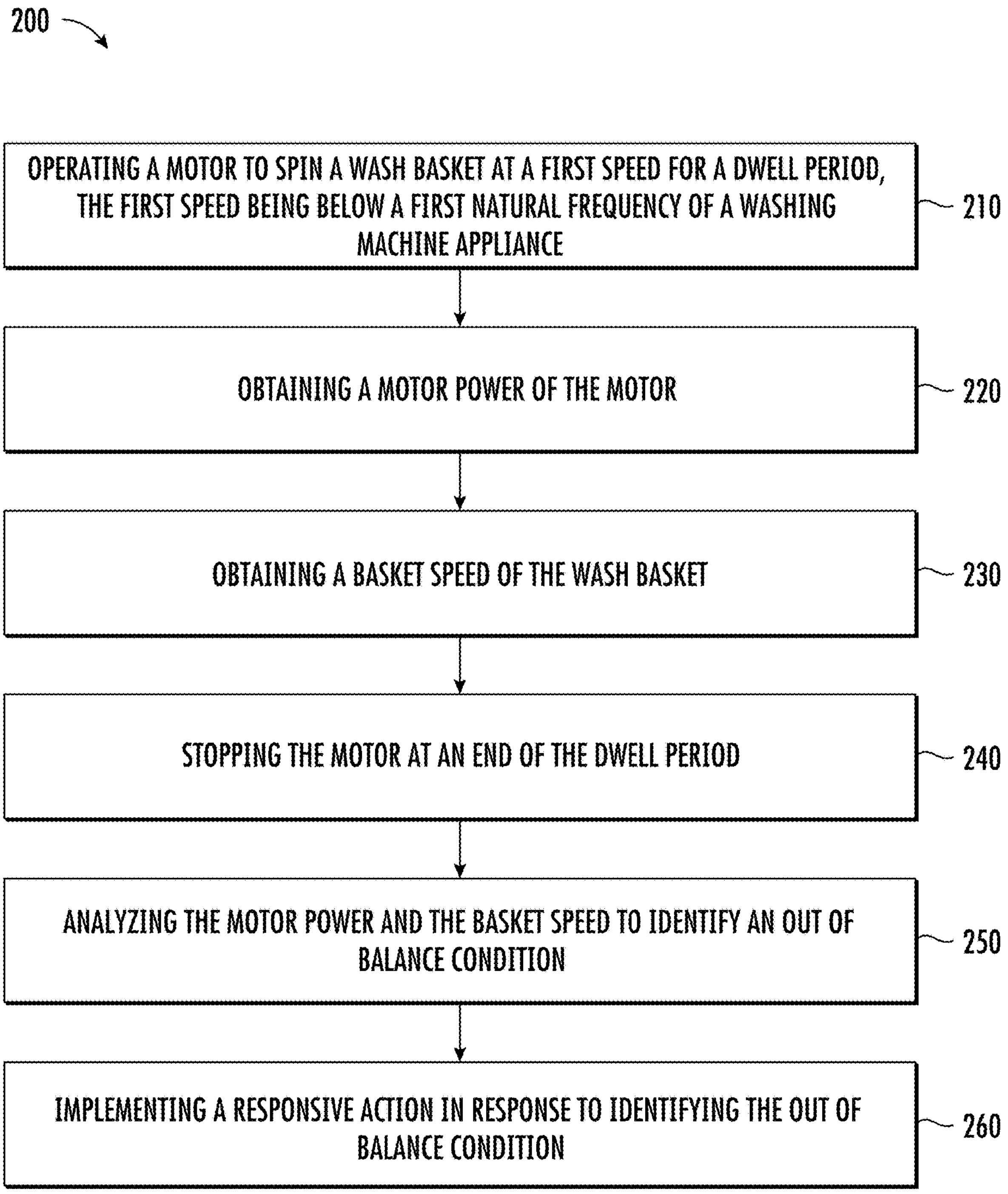
FIG. 4 illustrates a method of determining an out of balance condition in a washing machine appliance according to an example embodiment of the present subject matter.

FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using washing machine appliance 100 as an example, it should be appreciated that this method may be applied to the operation of any suitable laundry appliance, such as another washing machine appliance.

As explained herein, aspects of the present subject matter are generally directed to a method for sensing the load unbalance (e.g., in a top load washer) by accelerating a basket at a low-speed rotation below a first natural frequency of the machine. This method may include accelerating the basket at low speed (e.g., 40 RPM) while recording speed sensor and motor power data, implementing a dwell period (e.g., 5 seconds), and implementing a coast period down to 0 RPM. This method may include recording the average motor power during the dwell period and may detect an unbalance when more power is used during spin. Also, this method may include determining load unbalance when the motor power undershoot is less. In addition, the method may include determining load unbalance when it takes a longer amount of time to coast from the dwell to 0 RPM, e.g., to refine the unbalance detected based on motor power undershoot and average motor power.

Notably, other options for measuring load imbalance may have disadvantages. For example, a tub-mounted accelerometer may give a very accurate estimation of the movement of the tub, which may be used to estimate imbalance amounts. However, accelerometers can be very costly and difficult to implement. In addition, readings derived from motor velocity can detect large changes in speed or acceleration to detect imbalance amounts. However, these readings are typically only useful at higher spin speeds once the tub exhibits large motions, which can be undesirable to the consumer and detrimental to the overall life of the unit. By contrast, spinning at a speed below the first natural frequency of the machine can prevent noisy cabinet striking. In addition, spinning at such a low speed is very unobtrusive to the consumer and can be performed without altering the spin-drying profile.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A washing machine appliance defining a vertical direction, a lateral direction, and a transverse direction, the washing machine appliance comprising:
- a wash tub positioned within a cabinet;
- a wash basket rotatably mounted within the wash tub;
- a motor mechanically coupled to the wash basket;
- a controller operably coupled to the motor, the controller being configured to:
  - operate the motor to spin the wash basket at a first speed for a dwell period, the first speed being below a first natural frequency of the washing machine appliance;
  - obtain a motor power of the motor;
  - obtain a basket speed of the wash basket;
  - stop the motor at an end of the dwell period;
  - analyze the motor power and the basket speed to identify an out of balance condition; and
  - implement a responsive action in response to identifying the out of balance condition.

2. The washing machine appliance of claim 1, wherein the first speed is between about 30 and 50 revolutions per minute (RPM).

3. The washing machine appliance of claim 1, wherein the first speed is about 40 RPM.

4. The washing machine appliance of claim 1, wherein obtaining the motor power of the motor comprises obtaining an average motor power over the dwell period.

5. The washing machine appliance of claim 4, wherein analyzing the motor power and the basket speed to identify an out of balance condition comprises:
- determining that the average motor power exceeds a predetermined power threshold.

6. The washing machine appliance of claim 1, wherein the controller is further configured to:
- determine a motor power undershoot when the motor begins rotation of the wash basket.

7. The washing machine appliance of claim 6, wherein analyzing the motor power and the basket speed to identify an out of balance condition comprises:
- determining that the motor power undershoot falls below a predetermined threshold.

8. The washing machine appliance of claim 1, wherein analyzing the motor power and the basket speed to identify an out of balance condition comprises:
- measuring a coast time that it takes for the basket speed to fall to a second speed, the second speed being lower than the first speed; and
- estimating a load size based at least in part on the coast time.

9. The washing machine appliance of claim 8, wherein the second speed is about 10 RPM.

10. The washing machine appliance of claim 1, further comprising:
- a magnet and hall-effect sensor that is used to obtain the basket speed of the wash basket.

11. The washing machine appliance of claim 1, wherein the controller is further configured to:
- analyze the motor power and the basket speed to identify a balanced load condition; and
- operate the motor to implement a spin cycle in response to identifying the balanced load condition.

12. The washing machine appliance of claim 1, wherein the analysis to identify the out of balance condition is performed before a spin cycle.

13. The washing machine appliance of claim 1, wherein implementing the responsive action comprises:

performing a load redistribution procedure.

14. The washing machine appliance of claim 1, wherein implementing the responsive action comprises:

providing a user notification of the out of balance condition.

15. The washing machine appliance of claim 14, wherein the user notification is provided through a user interface panel.

16. The washing machine appliance of claim 14, wherein the controller is in operative communication with a remote device through an external network, and wherein the user notification is provided through the remote device.

17. A method of operating a washing machine appliance, the washing machine appliance comprising a wash tub positioned within a cabinet, a wash basket rotatably mounted within the wash tub, and a motor mechanically coupled to the wash basket, the method comprising:

operating the motor to spin the wash basket at a first speed for a dwell period, the first speed being below a first natural frequency of the washing machine appliance;

obtaining a motor power of the motor;

obtaining a basket speed of the wash basket;

stopping the motor at an end of the dwell period;

analyzing the motor power and the basket speed to identify an out of balance condition; and implementing a responsive action in response to identifying the out of balance condition.

18. The method of claim 17, wherein obtaining the motor power of the motor comprises obtaining an average motor power over the dwell period, and wherein analyzing the motor power and the basket speed to identify an out of balance condition comprises:

determining that the average motor power exceeds a predetermined power threshold.

19. The method of claim 17, further comprising:

determining a motor power undershoot when the motor begins rotation of the wash basket, and wherein analyzing the motor power and the basket speed to identify an out of balance condition comprises determining that the motor power undershoot falls below a predetermined threshold.

20. The method of claim 17, wherein analyzing the motor power and the basket speed to identify an out of balance condition comprises:

measuring a coast time that it takes for the basket speed to fall to a second speed, the second speed being lower than the first speed; and estimating a load size based at least in part on the coast time.

* * * * *